No. 630,532. Patented Aug. 8, 1899.
E. V. FAUCETT.
FRICTION CLUTCH.
(Application filed Apr. 16, 1898.)
(No Model.) 2 Sheets—Sheet 1.
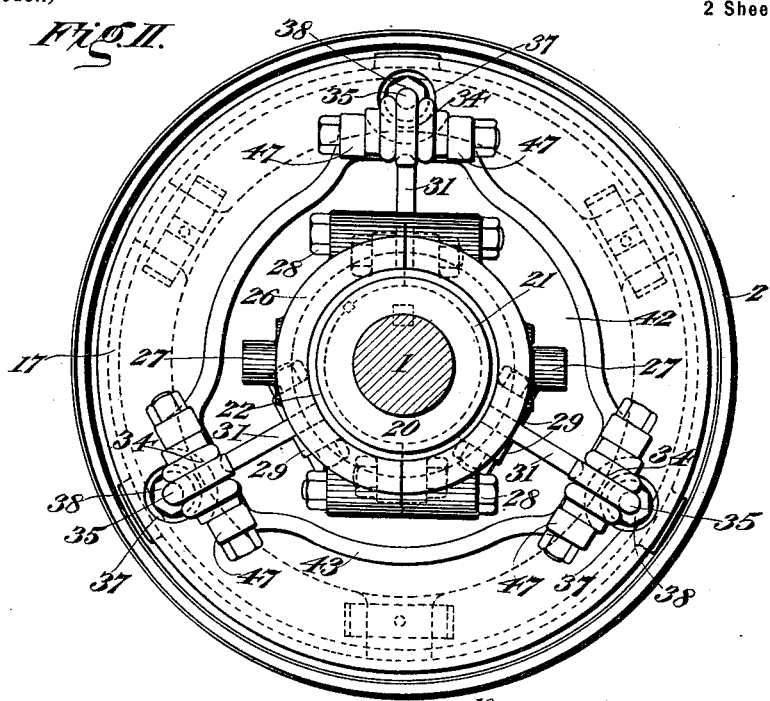
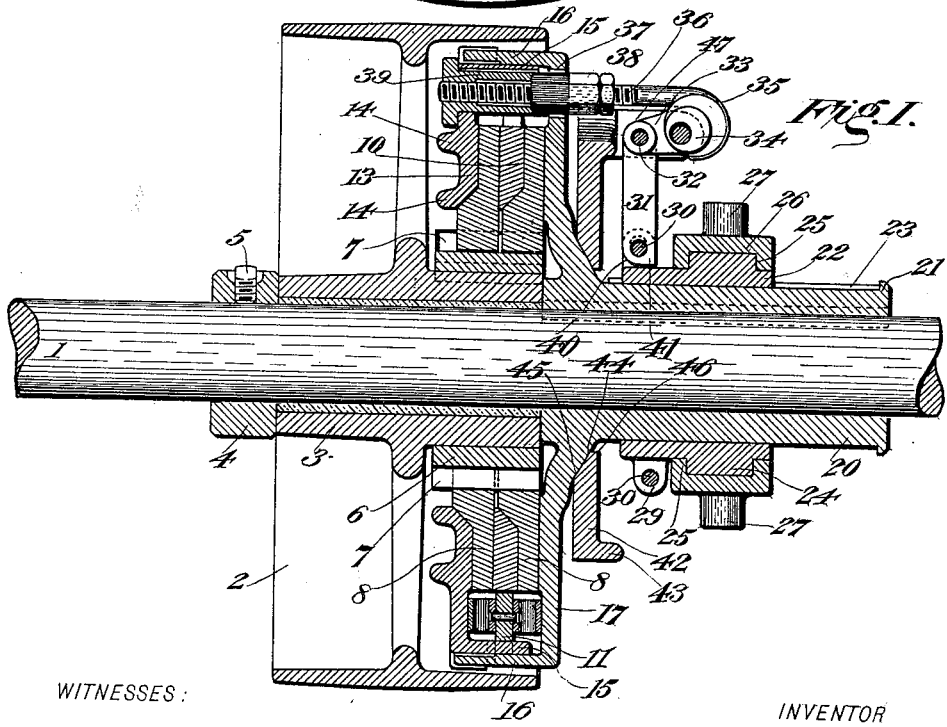
WITNESSES:
Wm. B. Foster.
Wm. H. Kirn.
INVENTOR
Eugene V. Faucett
THE NORRIS PETERS CO., PHOTO-LITHO., WASHINGTON, D. C.

No. 630,532. Patented Aug. 8, 1899.
E. V. FAUCETT.
FRICTION CLUTCH.
(Application filed Apr. 16, 1898.)
(No Model.) 2 Sheets—Sheet 2.
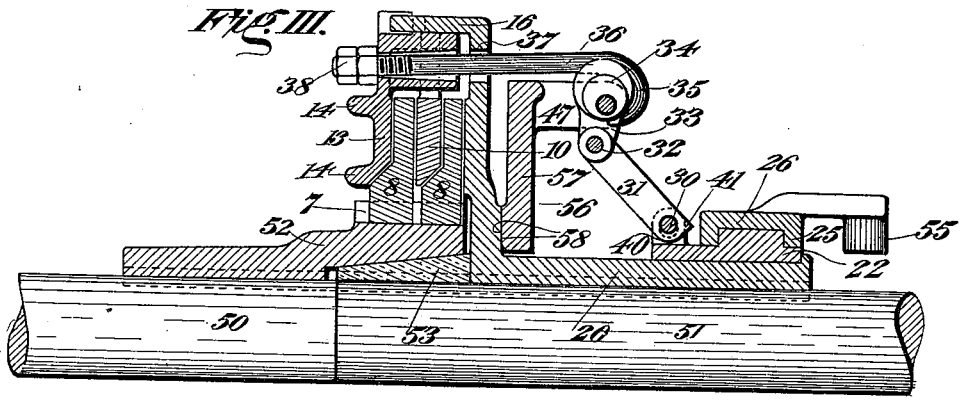
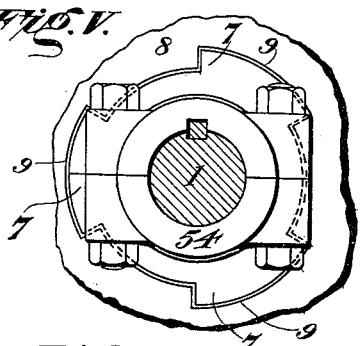
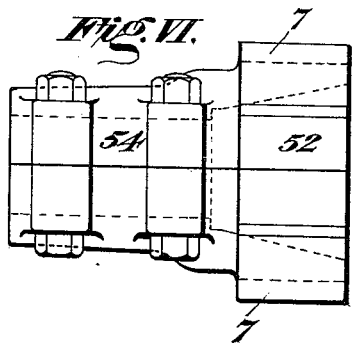
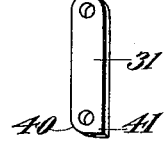
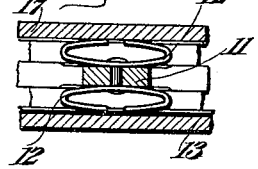
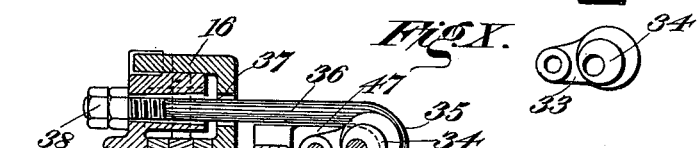
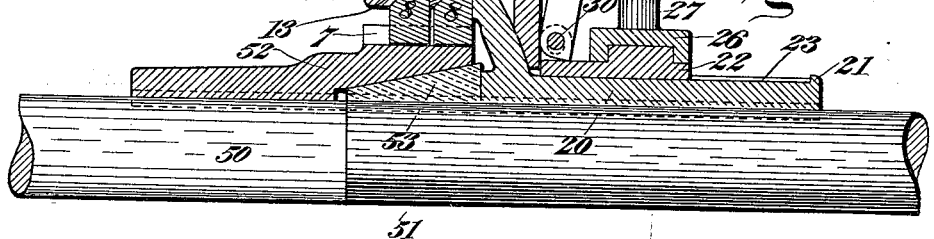
WITNESSES:
Wm. B. Foster.
Wm H. Kirn
INVENTOR
Eugene V. Faucett.
THE NORRIS PETERS CO., PHOTO-LITHO., WASHINGTON, D. C.

# UNITED STATES PATENT OFFICE.

EUGENE V. FAUCETT, OF WILMINGTON, DELAWARE.

FRICTION-CLUTCH.

SPECIFICATION forming part of Letters Patent No. 630,532, dated August 8, 1899.

Application filed April 16, 1898. Serial No. 677,881. (No model.)

*To all whom it may concern:*

Be it known that I, EUGENE V. FAUCETT, of Wilmington, in the county of New Castle, State of Delaware, have invented certain new and useful Improvements in Friction-Clutches, of which the following is a complete specification, reference being had to the accompanying drawings.

The object of my invention is to produce improved mechanism for coupling and uncoupling one rotatable body with respect to another.

In the accompanying drawings, Figure I is a longitudinal vertical section, partly in elevation, of a rotatable shaft, a pulley loosely mounted thereon, and my clutch mechanism for clutching and unclutching the pulley and shaft. Fig. II is an end elevation of the subject-matter of Fig. I, looking toward the clutch mechanism. Fig. III represents two rotatable shafts in axial alinement, together with a portion of clutch mechanism, showing clutch mechanism in the open or unclutched position. Fig. IV is a view similar to Fig. III, showing the clutch mechanism in the completely closed or clutched position. Fig. V is a fragmental view of a portion of clutch mechanism, showing method of mounting the friction-disks upon the shaft. Fig. VI is a top plan view of the split sleeve shown in Fig. V. Fig. VII is a sectional view illustrating the separating-springs employed for normally separating the clutch members of the clutch mechanism. Fig. VIII is a perspective view of the link of the clutch toggle-lever. Fig. IX is a top plan view of the clutch-actuating cam. Fig. X is a side elevation of the same.

Referring to the figures on the drawings, 1 indicates a rotatable shaft, to which another member—as, for example, a pulley 2—is to be clutched, or from which it is to be unclutched, as often as may be required. The pulley is carried upon the shaft, as by means of a hub 3, that is secured in position thereon at one end, as by a collar 4 and set-screw 5.

6 indicates a toothed ring secured to the hub 3 of the pulley. It is provided with lugs 7, and both it and the lugs are preferably slightly tapered in the direction of the axis of the shaft 1 in order to insure proper centering of the disks in operation and after wear.

The ring 6 accommodates friction-disks 8, that are loosely mounted upon the ring 6, but are compelled to rotate with it by the lugs 7, which fit into notches 9 in the center bores of the disks.

10 indicates a friction-ring located between the friction-disks 8 and provided at suitable intervals with lugs 11, to which are secured springs of suitable shape, preferably the elliptical springs 12. (Clearly shown in Fig. VII.)

13 indicates a compression member or ring that is preferably provided with stiffening-ribs 14. It is provided with lugs 15, which fit into the flanges 16 of a counter compression member 17. As will clearly appear upon comparison of Figs. I and II, the friction-disks 8 and the friction-ring 10 are included between the compression members 13 and 17, the flange 16 of the last-named compression member serving, in connection with the lugs 15 of the former, to constitute a completely-enveloping case for the clutch members or friction-disks above referred to.

The springs 12 serve ordinarily to separate the members 13 and 17 and to permit when so separated the free and independent rotation of the compression members 13 and 17, with appended friction-ring 10, about the friction-disks 8, which are secured to the hub 3 of the pulley 2. Upon the contrary, if pressure be exerted to draw the compression members 13 and 17 together and force into frictional contact the several faces of the clutch members included between them the pulley 2 will be firmly united to the compression member 17. Consequently if the member 17 be securely fixed to the shaft 1 the pulley, when the compression members 13 and 17 are united, will derive a rotary motion from the shaft 1, but will lie idly upon it when the compression members are in the unclutched condition.

To accomplish the end above referred to, the compression member 17 is mounted upon or made integral with a hub 20, that is splined or otherwise secured to the shaft 1.

21 indicates a stop-collar which is designed to limit the movement upon the hub 20 of a sliding sleeve 22, that is grooved to accommodate a feather 23 upon the exterior of the hub 20. The sliding sleeve 22 is preferably provided with a projecting annulus 24, that works between flanges 25 of a loose collar 26. The collar 26 is provided with trunnions 27, by means whereof a lever may be attached to the collar 26 for imparting through it longitudinal movement to the sleeve 22. The form of lever applicable to the trunnions is not illustrated, being the familiar means of operating clutches of this description.

The collar 26 is preferably a split collar and provided with bolts 28 (see Fig. II) for securing it in position and for affording means for separating the collar from the sleeve without disturbing the shaft.

The sleeve 22, being designed as a means for compressing together the compression members 13 and 17 above referred to, is provided with a series of pairs of lugs 29, between each pair of which is loosely pivoted, as indicated at 30, one end of a link 31, that is pivoted at its other end, as indicated at 32, to the crank-arm 33 of a cam 34. One link 31 and cam 34 are provided for each pair of lugs 29, of which there are preferably three. Each cam 34, being secured to or carried by the compression member 17, engages with the hooked end 35 of one of three bolts 36, which, passing through apertures 37 in the compression member 17, are secured, respectively, as by nuts 38 and sleeves 39, to the compression member 13.

By means of the link connection between the sleeve 22 and the cams 34 the movement of the sleeve 22 toward the stop-collar 21 is adapted to unclutch the clutch or separate the clutch members and compression members, upon whose contact, as above explained, the clutching action of the mechanism depends.

The unclutching operation of the mechanism is clearly indicated in Fig. III, although that figure, as will be hereinafter more clearly explained, illustrates a slightly-modified form of my clutch from that already described.

Each link 31 is provided upon its lower end on one side with a curved surface 40 and on the other side with a sharp toe 41. By the aid of this construction, in conjunction with its loose pivot 30, a double-toggle-lever action is obtainable. Through the presence of the curved faces 40 the movement of the sleeve 22 is unimpeded by contact on the one side with the links 31. On the other hand, however, if the sleeve 22 be forced away from the stop-collar 21 until the links 31 are brought substantially into the vertical position, as shown in Fig. I, a certain degree of compression will be exerted through the cams 34 and bolts 36 by the compression members 13 and 17 upon the intermediate clutch members. A further movement of the sleeve 22 in a direction away from the stop-collar 21 will cause the toes 41 of the links 31 to act against the face of the sleeve 22 as a fulcrum and will exert an additional degree of leverage to force the levers 33 outwardly and impart an additional degree of rotation to the cams 34.

The operation of the toes 41 is, as before suggested, obtainable through the presence of the loose pivots 30, above described.

The final position of the sleeve 22, above referred to, is clearly indicated in Fig. IV of the drawings. In that position not only is the last degree of compression exerted, but the sleeve 22 is firmly locked by the links 31 in the position into which it has been forced.

It was suggested that the cams 34 might be rotatably secured to or carried upon the compression member 17. I prefer to employ as a means of supporting the cams 34 an equalizing-plate 42, which may be provided with a stiffening-flange 43. This equalizing-plate may be provided with a curved central bore 44, that rides upon a concave surface 45, formed at the junction of the compression member 17 with its hub 20, after the manner of a ball-and-socket joint, the internal bore of the plate 42 being somewhat greater, as indicated at 46, than the external bore of the hub 20.

The cams 34 are revolubly mounted in arms 47, provided for them upon the equalizing-plate 42. Through the employment of the equalizing-plate 42 if a greater tension should be exerted upon one of the bolts 36 than upon another the equalizing-plate turning or rocking upon the convex bearing-surface 45 would adjust itself and, distributing the unevenness of adjustment to all of the bolts 36, dissipate it, and thereby prevent the tendency toward unequal wear upon the abrasive faces of the several clutch members and compression members.

While, as above suggested, I prefer to employ the equalizing-plate 42, it is obvious from a mere inspection of the drawings that the arms 47 might be secured directly to the compression member 17. That, however, would require a nice and equal adjustment of the tension upon the several bolts 36.

While I illustrate two friction-disks 8 and an intermediate ring 10, I wish to distinctly specify that I do not limit myself to any particular number of clutch members. It is sufficient that there be one clutch member upon one of the rotatable bodies and a pair of compression members upon the other body adapted to make frictional contact with the clutch member, and thereby as often as required to afford means for coupling one of the rotatable bodies to the other.

In Figs. III and IV of the drawings I illustrate a slightly-modified form of my clutch, showing for economy of illustration only a portion of the mechanism which is illustrated in full in Figs. I and II already described. In these figures in place of a pulley 2, representing one rotatable body, and a shaft 1, representing another, I illustrate two independently-rotatable shafts 50 and 51. They may be held in alinement, as by engaging inversely-conical members 52 and 53, the former secured to the shaft 50, as by a split sleeve 54, and the latter projecting beyond the compression member 17 from the hub 20.

With the exception of the elements herein described the mechanism illustrated in Fig. IV is precisely the same as that specified with reference to Figs. I and II and does not require further description or designation by additional numerals.

In Fig. III a slightly-modified form of trunnion 55 is shown in place of the trunnions 27, already described. Its function, like that of the trunnions 27, is to accommodate an operating-lever for the collar 26, and it does not, therefore, require special description. In this figure also I illustrate a modified method of mounting the equalizing-plate (indicated at 56) upon the compression member, (formerly indicated at 17, but herein referred to for the purpose of distinction as 57.) In place of the ball-and-socket connection between the equalizing-plate and the compression member I provide these two members with contiguous flat surfaces, as indicated at 58. The action of the equalizing members is similar to that previously described, but the equalization of strain thereby is obtained either by tilting or rocking on lugs or sliding of plain surfaces of the equalizing member upon the compression member instead of a sliding or rotary movement upon it, as above described.

What I claim is—

1. In a clutch, the combination with a pair of compression members, and intermediate clutch member, of a series of cams operatively connecting the compression members, and successively-acting, double-toggle-lever cam-actuating mechanism, substantially as set forth.

2. In a clutch, the combination with a pair of compression members, and intermediate clutch member, of a series of cams, an equalizing-plate supporting the cams upon one of the compression members, means connecting the cams with the other compression member, and cam-actuating mechanism, substantially as set forth.

3. In a clutch, the combination with a pair of compression members, and an intermediate clutch member, of a series of cams, an equalizing-plate supporting the same, a ball-and-socket joint between the equalizing-plate and one compression member, means connecting the cams with the other compression member, and cam-actuating mechanism, substantially as set forth.

4. In a clutch, the combination with a pair of compression members, and an intermediate clutch member, of a series of cams operatively connecting the compression members, arms upon the cams, respectively, links pivoted to the respective arms, a link-actuating element loosely pivoted to the links, respectively, and toes upon the side of each link in operative proximity to the link-actuating element, substantially as set forth.

In testimony of all which I have hereunto subscribed my name.

EUGENE V. FAUCETT.

Witnesses:
THOMAS REARDON,
J. JACKSON PEIRCE.